Figure 1:
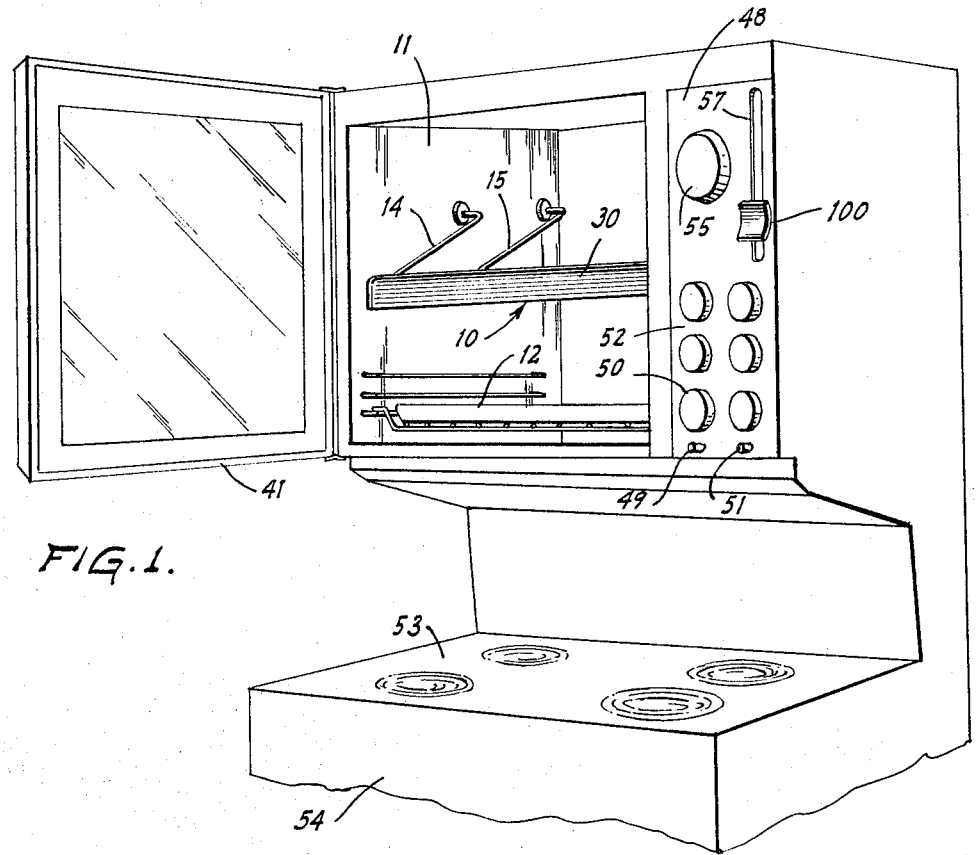

Oct. 25, 1966    H. D. FERGUSON, JR    3,281,575
ADJUSTABLE ELECTRIC BROILING APPARATUS
Filed March 20, 1964    2 Sheets-Sheet 1

INVENTOR.
HARRY D. FERGUSON, JR.
BY Frank D. Prager
ATTORNEY

Oct. 25, 1966   H. D. FERGUSON, JR   3,281,575
ADJUSTABLE ELECTRIC BROILING APPARATUS
Filed March 20, 1964   2 Sheets-Sheet 2

INVENTOR.
HARRY D. FERGUSON, JR.
BY
Frank D. Proger
ATTORNEY

United States Patent Office 3,281,575
Patented Oct. 25, 1966

3,281,575
ADJUSTABLE ELECTRIC BROILING APPARATUS
Harry D. Ferguson, Jr., Ambler, Pa., assignor to Philco Corporation, Philadelphia, Pa., a corporation of Delaware
Filed Mar. 20, 1964, Ser. No. 353,566
2 Claims. (Cl. 219—404)

This invention deals with cooking apparatus, and relates especially to adjustable broiling apparatus for the oven of a household electric range.

A general objective of my invention is to provide broiling apparatus which the housewife can conveniently adjust in various positions. Thus far it was generally necessary, when such adjustment was required, to raise or lower the food below the broiling heaters. This was inconvenient and tiresome. In addition, this kind of adjustment made it difficult, and sometimes impossible, to cook certain types of food satisfactorily, as the position of the food best suited to application of broiling heat is not best for other purposes such as application of baking heat.

Attempts were made to provide independent bake and broil adjustments, by using one set of heater coils tiltably arranged above the food and another set similarly arranged below the food. However, oven space was poorly utilized by such tiltable heaters, and broiling effects were irregularly distributed over the food. Heat economy was poor, the appearance of the oven was awkward, and it was not easy to adjust the heater positions; it was necessary, for the latter purpose, to open the oven door wide, thereby interfering with temperature regulation within the oven.

It is a broad objective of the invention to improve ovens in these respects.

This object, along with others, has been realized by a new combination of heaters, hangers, and auxiliary devices for the same. A preferred form of the new and improved oven structure comprises a flat and compact heater and reflector unit which covers a major portion of the oven area, for broiling purposes, this unit being maintained in horizontal position while allowing vertical adjustment thereof in the oven. The broiling unit preferably comprises a pair of straight, horizontal heater tubes, each rigid with and continued by a pair of mutually parallel, normally inclined hanger tubes swingably secured to side walls of the oven. In effect, the horizontal heater and reflector unit is thus supported by four parallel hangers, two on each side and which are disposed in generally inclined planes. Each heater with its hangers constitutes a tube unit bent in the shape of a U, pivotally suspended by its side arms and pivotally supporting the reflector. The horizontal broiling unit can be displaced upwardly and downwardly by a handle, mounted for upward-downward motion exteriorly of the oven chamber.

Figure 2:
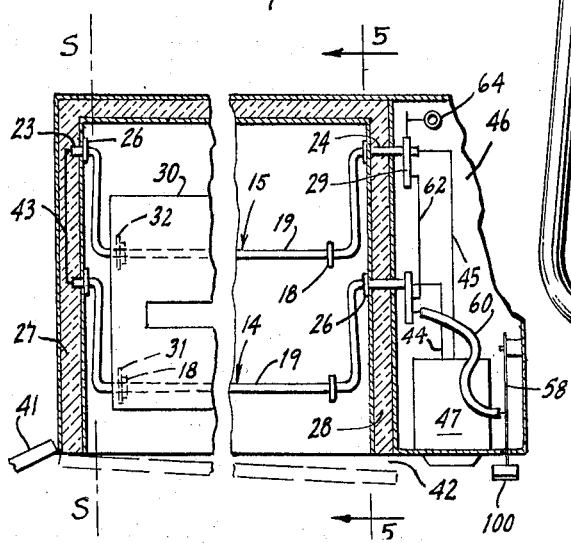
Figure 3:
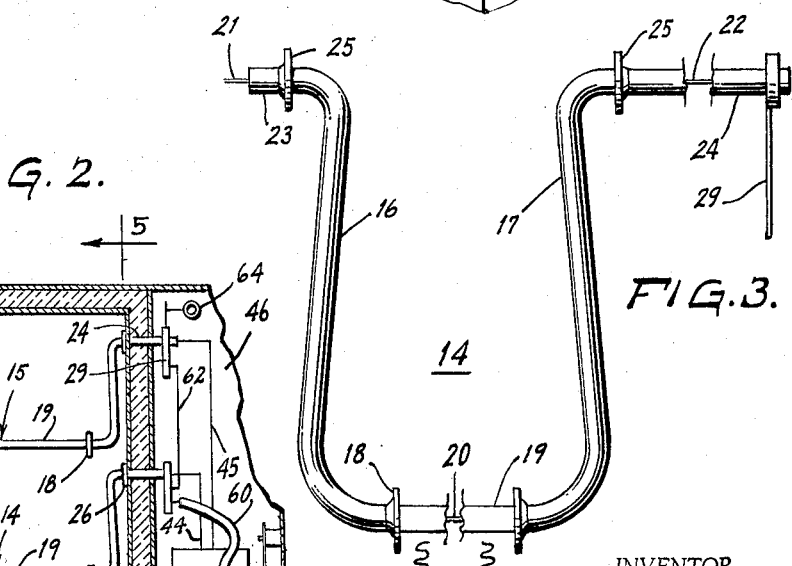

The preferred embodiment of my invention appears, in perspective, in FIGURE 1 of the drawing appended hereto. FIGURE 2 is a plan view of the oven with the top thereof removed. FIGURE 3 shows the construction of a broiler element removed from the oven.

Figure 4:
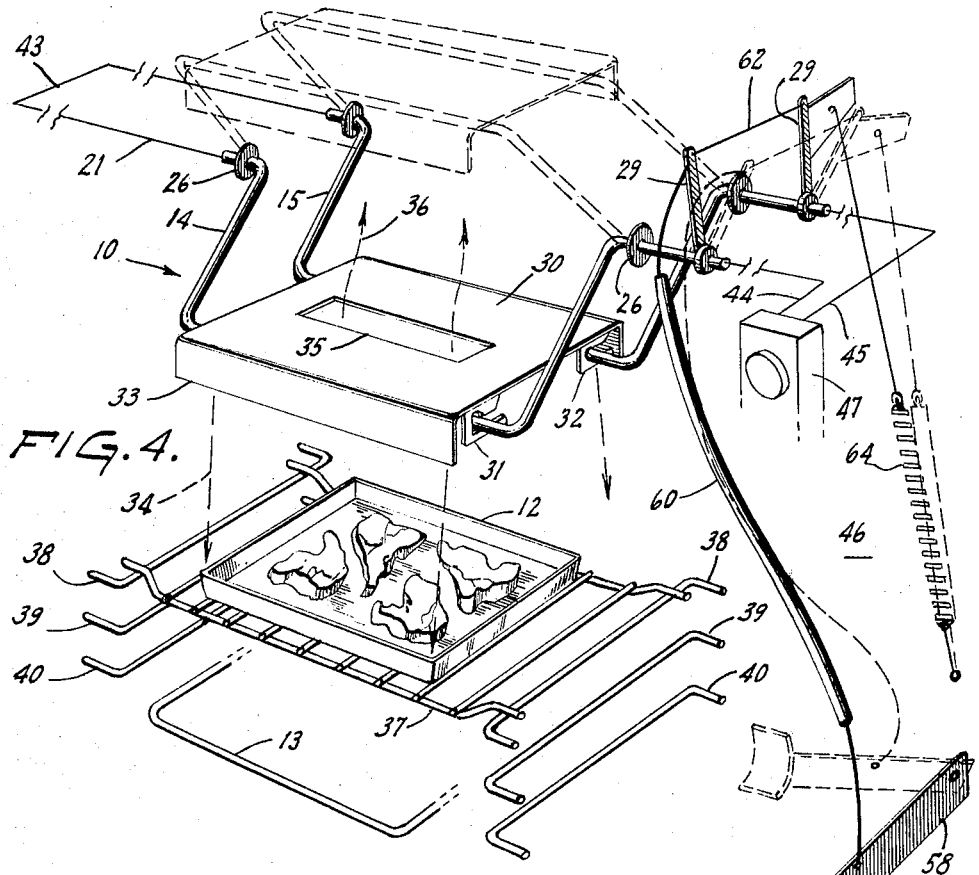
Figure 5:
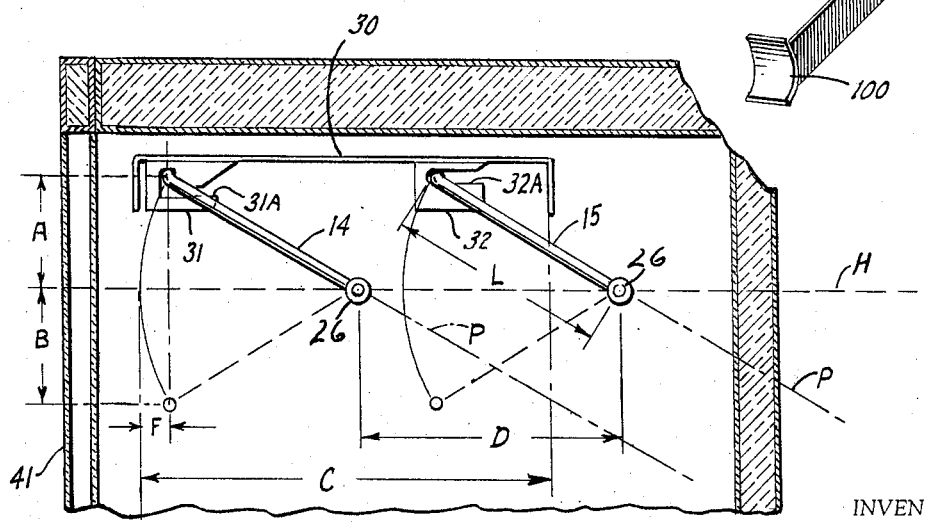

FIGURE 4 is a schematic perspective view of the new mechanism, showing it in two different positions thereof. FIGURE 5 is a side view of the apparatus, in two different positions, the view being taken along lines 5—5 in FIGURE 2.

The new, flat vertically adjustable broiling apparatus 10 is shown in FIGURE 1 as installed in oven 11 and controlled, as to position, by adjustment handle 100. The tray 12 containing food to be cooked is disposed below this broiling unit, while a conventional, horizontal baking heater coil 13 can be provided below the food as is indicated in FIGURE 4.

FIGURE 2 shows the broiling unit as comprising generally U-shaped tube elements 14, 15. At least two such elements are provided, insuring adequate distribution of heat to different portions of the oven area, and relatively large ovens may use three or more such elements. These elements are bent in substantially planar form and are swingably disposed in generally parallel and oblique planes P, P (FIGURE 5).

The side arms of each U are used as hangers. I have found it best to use only a portion of tube unit 14, 15—a straight, horizontal tube, connecting two hangers—as a heater. Therefore, as shown in FIGURE 3, each element 14, 15 comprises a pair of tubular hangers 16, 17. Each hanger tube has an outwardly bent pivot portion and a free, inwardly bent terminal portion with a fitting 18 thereon to connect the hanger rigidly with one end of a straight horizontal heater tube or sheath 19. As indicated in FIGURE 2, hanger arms 16, 17 can swing in planes S adjacent and parallel to the side walls of the oven. The arms are advantageously made of ordinary steel or the like, while interconnecting sheath 19 is made of an alloy (known by itself) for the construction of heater tubes.

An elongate heating element such as a nickel-chrome wire 20 (FIGURE 3) extends through heater tube 19 and is electrically insulated therefrom but thermally bonded thereto by well-known filling material (not shown). In the vicinity of fittings 18 the ends of the heating wire are connected with suitable electric conductors, such as insulated copper wires, end portions of which are shown at 21, 22 and which extend, respectively, through side arms 16, 17 and further, through open-ended side arm portions 23, 24.

The latter portions are mutually aligned and parallel with sheath 19, and have bearing members 25 thereon. The bearing members for each U-tube are held in fixed and horizontally aligned bearings 26, provided in side walls 27, 28 of the oven as schematically shown in FIGURE 2; bearing constructions of this type are known. The invention relates particularly to the new construction and arrangement of U-tube unit 10, 14, 15, 100.

End portion 24 of each U-tube, shown at the right hand of the drawing and extending through a heat insulated oven wall 28, carries a manipulator lever 29 on the far side of this wall. The manipulator levers of both U-tubes are conjointly operated by manual handle 100, best shown in the upper right hand portion of FIGURE 1 and diagrammatically shown in the lower right hand portion of FIGURE 4. When the housewife raises this handle she thereby causes a rocking motion of levers 29, which leads to corresponding raising of unit 10. Lowering of the handle causes corresponding lowering of this unit. The selected setting of broiler unit 10 can be maintained in a number of ways, for instance by friction of hanger tubes 14, 15 in their pivots.

As further shown in FIGURES 1, 2 and 4 a metallic reflector 30 is provided, closely overlying heating sheath elements 19 and in effect forming therewith a heater unit. This reflector is supported on the swingable, U-shaped heater and hanger tubes 14, 15 and is shown as fastened to these tubes, in pivotable and removable fashion, by grooved clip members 31, 32 (FIGURE 4). These clip members engage the hanger tubes on the outside of fittings 18 for sheath 19 (FIGURE 2), such an arrangement being preferred in order to facilitate removal and reinstallation of the reflector, while avoiding injury to heating element 19 which becomes red hot in normal operation. In order to clean surfaces of the reflector and oven, the reflector can be removed by lifting up the front portion thereof and then forwardly withdrawing the entire reflector. Grooves 31A and 32A in the attaching clips (FIGURE 5) are of such design that the reflector is easily re-installed by moving it backwards and then letting it fall into place. This operation is particularly simple when two heater units 14, 15 are provided, as is preferred. It will be seen that the reflector, held at 31A and 32A, is pivotally connected with the hanger system and that the broiler adjusting motions, imparted by the manipulator handle, do not impair or improperly displace the several parts.

Preferably, and as indicated in FIGURE 5, bearings 26 on each side wall of the oven are spaced by a distance D slightly greater than the length L of each side arm 16, 17, in order that the several hanger and heater units 14, 15 be swingably movable conjointly through positions wherein the hangers point forwardly in either upward or downward directions, and including a horizontal position wherein the parallel planes P, P of the several hanger units are merged in a single horizontal plane H.

As also shown in FIGURE 5 I have arranged the apparatus in such a way taht the heater unit can swing to approximately equal maximum distances A, B above and below horizontal center plane H. Advantageously these distances are limited with respect to side arm length L in such a way that the forward and backward displacement F of the unit, incident to its swinging motions, is relatively minor; this facilitates the provision of adequate coverage C by broiling unit 10, for the entire oven area, in all positions of the unit. In the interest of compact arrangement it is further preferred that the broiling unit, when raised to the uppermost extent of its possible rising motion A, be disposed substantially at the top of oven 11, as shown.

As shown in FIGURE 4, reflector 30 can be a flat metallic sheet. It may, if desired, be provided with a reflective underside, whereby the heat generated in elements 19 is directed toward the food (see downward arrows 34). A flange 33 depends from the front edge of the reflector to minimize forward escape of heat and smoke. A slot 35 is desirably formed in a middle portion of the reflector in order to allow hot air to escape upwardly (see upward arrows 36), thereby also reducing the tendency to generate smoke.

Food 12 is shown as contained in a pan which rests on a grid 37, supported in turn on one of several pairs of support bars 38, 39, 40. Before placing this pan in the oven, the housewife can raise broiling unit 10, by handle 100. By selecting suitable support bars, she can establish proper spacing between baking coil 13 and food tray 12. According to the invention she can then adjust the spacing between food tray 12 and broiling unit 10 by lowering handle 100 to a proper extent. The setting of unit 10 can also be varied during the broiling process, by again manipulating handle 100, at which time the oven door may be open, partly open, or closed. The user can thus control the application of broiling heat to the food and can do so without disturbing the position of baking unit 13 (FIGURE 4) or oven door 41 (FIGURE 2). The door, of course, is left open a small crack 42, during a typical broiling operation.

The above-mentioned conductive wires 21, 22, extending through the side arms of the heater and hanger unit (FIGURE 3), are in series respectively with a wire 43 interconnecting the two elements and with wires 44, 45 extending into and through a control cabinet 46 adjacent oven 10 (FIGURE 2). In this cabinet, control apparatus 47 is interposed on the latter wires, and such apparatus can provide a suitable system of control members in front 48 thereof (FIGURE 1). For instance a push button 49 can be used for turning broiling unit 10 on or off, while a thermostatic control knob 50 can serve to regulate the temperature of this unit. Similarly provided are push button and thermostat control means 51 for the baking coil, controls 52 for range surface units 53 and for an additional oven 54, and a timer unit 55. The arrangement of such controls is known to the art and need not be described herein.

Position control handle 100 of the new adjustable broiling unit 10 is advantageously disposed adjacent the area of oven door 41 and in the vicinity of the timing and temperature controlling dials on front 48 of the control cabinet. It is preferred to construct this handle in such a way that it can be moved up and down along a vertical slot 57 in front structure 48 to effect upward and downward adjustments of broiler unit 10, and that the various positions of handle 100 along this slot approximately coincide with the corresponding vertical positions of broiler unit 10. For this latter purpose, and as best indicated by FIGURE 4, handle 100 is secured to a lever 58 which can be approximately as long as a hanger 17, this lever being suitably pivoted in control compartment 46. Approximate parallelism of lever 58 with hangers 17 is maintained by a flexible rod 60, which transmits motion in well known manner from manually adjusted lever 58 to manipulator levers 29 of the hanger system.

The manipulator levers can be interconnected by a rod 62. They are shown as suitably engaged by a "counterweighting" spring 64, offsetting the weight of hanger, reflector and manipulator system 14, 15, 30, 58. This weight would otherwise be unbalanced in the various operative conditions of the apparatus.

While only a single embodiment of the invention has been described, the details thereof are not to be construed as limitative of the invention. The invention contemplates such variations and modifications as come within the scope of the appended claims.

I claim:

1. Broiling apparatus comprising a generally flat reflector for downward reflection of heat; heating means closely underlying said reflector and whereto the reflector is removably secured; and swingable means for energizing said heating means and supporting the latter and its reflector within an oven, said swingable means providing for upward and downward adjustment of said heating means and reflector while maintaining the latter element in horizontal position.

2. In cooking apparatus, a system of heater tubes disposed in substantially horizontal, parallel orientation, and a system of substantially parallel and generally inclined support tubes, each support tube having one end rigidly secured to an end of one heater tube and having the other end pivotally supported for conjoint motions of the support and heater tubes to raise and lower the heater tubes while maintaining their said orientation.

References Cited by the Examiner

UNITED STATES PATENTS

| | | | |
|---|---|---|---|
| 2,848,592 | 7/1958 | Mergen | 219—404 |
| 3,031,948 | 5/1962 | Lotter | 99—390 |
| 3,040,730 | 6/1962 | Hurko et al. | 126—25 |

RICHARD M. WOOD, *Primary Examiner.*

C. L. ALBRITTON, *Assistant Examiner.*